United States Patent [19]

Shinozaki et al.

[11] 4,124,516

[45] Nov. 7, 1978

[54] DOT-ETCHING SOLUTION

[75] Inventors: Fumiaki Shinozaki; Tomoaki Ikeda; Yasuo Washizawa; Sho Nakao, all of Asaka, Japan

[73] Assignee: Fuji Photo Film Co., Ltd., Minami-ashigara, Japan

[21] Appl. No.: 817,475

[22] Filed: Jul. 20, 1977

[30] Foreign Application Priority Data

Oct. 18, 1976 [JP] Japan ................................ 51/124618

[51] Int. Cl.$^2$ ................................................ C09K 13/04

[52] U.S. Cl. .................................... 252/79.2; 156/665; 156/905

[58] Field of Search ............. 156/664, 665, DIG. 905; 252/79.2, 79.4, 136, 79.1, 79.5

[56] References Cited

U.S. PATENT DOCUMENTS

| | | | |
|---|---|---|---|
| 2,882,135 | 4/1959 | Elliott | 252/79.5 |
| 3,663,441 | 5/1972 | Gulla | 156/665 |

FOREIGN PATENT DOCUMENTS

| | | | |
|---|---|---|---|
| 936,454 | 11/1973 | Canada | 156/665 |

OTHER PUBLICATIONS

*Kirk–Othmer: Encyclopedia of Chemical Technology,* 2nd ed., vol. 15, pp. 316–317.

*Primary Examiner*—Jerome W. Massie

*Attorney, Agent, or Firm*—Sughrue, Rothwell, Mion, Zinn and Macpeak

[57] ABSTRACT

A dot-etching solution for dot-etching a halftone image of a metal composed mainly of aluminum, the dot-etching solution comprising (1) water, (2) (a) phosphorous acid or (b) phosphorous acid and phosphoric acid, (3) at least one of a bismuth compound and an antimony compound, and (4) at least one compound selected from hydrogen chloride, an alkali metal chloride, calcium chloride and magnesium chloride.

9 Claims, No Drawings

DOT-ETCHING SOLUTION

BACKGROUND OF THE INVENTION

1. Field of the Invention

This invention relates to a dot-etching solution for dot-etching a halftone dot image of a metal composed mainly of aluminum.

2. Description of the Prior Art

A method for forming a metal image has heretofore been known which comprises imagewise exposing to electromagnetic radiation a metal image-forming material consisting of a support such as a glass plate or a synthetic resin film, a thin layer of metal composed mainly of aluminum on the support and a photosensitive resin (or photoresist) layer on top of the metal layer, dissolving the exposed or unexposed portion of the photosensitive resin layer with an organic solvent to remove that portion, and dissolving the uncovered metal layer beneath that portion using an etchant solution thereby to form an image composed of the metal layer and the photosensitive resin layer, or if desired, to form an image composed only of the metal layer by removing the photosensitive resin layer. If electromagnetic radiation is used to form a halftone dot image in accordance with this method, a metal image corresponding to the halftone dots can be obtained. In order to vary the density of the halftone dot image, it has been the practice in the art of handling halftone images to perform an operation called "dot-etching" whereby the size of the dots is partially reduced.

Usually, lithographic films are used to produce halftone images. In the dot size reduction of lithographic films with a reducing solution, the reducing solution acts on the entire surfaces of the silver grains that form the image. Hence, this reducing operation frequently results in a decrease of the density of the individual dots simultaneously with the reduction of the halftone dot area. In contrast, since in the above-described image-forming material, a resin layer substantially impermeable to a dot-etching solution is present on top of a thin metal layer which is the main material for forming an image by not transmitting light, this type of image-forming material has the advantage that the surfaces of the halftone dots are not etched and since etching from the sides of the dots only occurs the dot-etching results only in the reduction of the area of the dots. On the other hand, the metal must be etched by the dot-etching solution which has passed through a very small space between the substrate and the hardened photoresist layer on the dot of the metal layer. Hence, such a dot-etching solution must perform etching at commercially sufficient speeds. Moreover, such a solution should not degrade the photosensitive resin layer remaining on the metal layer nor contain substances harmful to the human body, and should reduce only the sizes of dots while correspondence of the shape of the etched dots to the shape of the dots before dot-etching is maintained.

Conventional reducing solutions comprising sulfuric acid, hydrochloric acid, nitric acid or hydrofluoric acid used for etching aluminum or aluminum alloys are unsuitable as dot-etching solutions for image-forming materials of the type described above. A solution consisting mainly of sulfuric acid has a slow etching speed, and long periods of time are required to achieve the desired amount of dot-etching. A solution consisting mainly of hydrochloric acid is hazardous to working personnel because hydrogen chlroide diffuses into the air, as described, for example, in Japanese patent application (OPI) No. 10737/75. A solution consisting mainly of nitric acid does not uniformly etch the thin metal layer, and results in etched dots having poor shapes. A solution consisting mainly of hydrofluoric acid is dangerous to handle.

Japanese patent publication No. 25611/71 discloses a system composed mainly of phosphoric acid in which the phosphoric acid provides the main etching action of the surface of aluminum or an aluminum alloy, and a chloride or nitrate of a metal having a lower ionization tendency that aluminum, such as $NiCl_2$ or $Cu(NO_3)_2$, acts to promote the speed of etching. However, the use of nickel or copper in a treating solution to be discharged as waste should absolutely be avoided to protect against environmental pollution.

SUMMARY OF THE INVENTION

Extensive work has been done to overcome the difficulties of the conventional techniques described hereinabove and to provide a dot-etching solution having the characteristics required of dot-etching solutions, and has led to the accomplishment of the present invention.

Accordingly, the present invention provides a dot etching solution for dot-etching a halftone image of a metal composed mainly of aluminum comprising (1) water, (2) phosphorous acid or phosphorous acid and phosphoric acid, (3) at least one of a bismuth compound and an antimony compound, and (4) at least one compound selected from hydrogen chloride, an alkali metal chloride, calcium chloride and magnesium chloride.

In a preferred embodiment of this invention, this invention provides a low-viscosity dot-etching solution (for simplicity to be referred to hereinafter as dot-etching solution (I)) comprising (1) water, (2) phosphorous acid, (3) at least one of a bismuth compound and an antimony compound, and (4) at least one of hydrogen chloride, an alkali metal chloride, calcium chloride and magnesium chloride.

In another preferred embodiment of this invention, this invention provides a low-viscosity dot-etching solution (for simplicity to be referred to hereinafter as dot-etching solution (II)) comprising (1) water, (2) phosphorous acid and phosphoric acid, (3) at least one of a bismuth compound and an antimony compound, and (4) at least one of hydrogen chloride, an alkali metal chloride, calcium chloride and magnesium chloride.

DETAILED DESCRIPTION OF THE INVENTION

The dot-etching solution of the invention is used to reduce the sizes of halftone dot images of a metal composed mainly of aluminum. Dot-etching solutions (I) and (II) as described above, have a low viscosity, and as a result thereof are particularly preferred dot-etching solutions of this invention, in which the term "low viscosity" as used in the description contained herein means a viscosity of not more than about 10 centipoises at 25° C. ± 2° C.

Water, phosphoric acid and phosphorous acid as components (1) and (2) of the dot-etching solutions of this invention are conventional and, as a result require no detailed description thereof. Commercially available phosphorous acid can be used in this invention and such is generally a solid at room temperature (about 20°–30°

C.) and the phosphoric acid which can be used in the invention is a solid at room temperature, and such is generally employed as an 85 wt% aqueous solution in practical use.

As component (3), suitable bismuth compounds include, for example, bismuth halides such as $BiCl_3$, $BiBr_3$ or $BiI_3$, bismuth oxides such as $Bi_2O_3$, and other bismuth compounds such as $Bi_2(SO_4)_3$ or $Bi(NO_3)_3$. Examples of suitable antimony compounds which can be used as component (3) are antimony halides such as $SbCl_3$, $SbBr_3$ or $SbI_3$, antimony oxides such as $Sb_2O_3$ or $Sb_2O_5$, and other antimony compounds such as $Sb_2(SO_4)_3$ or $Sb(NO_3)_3$. At least one bismuth or antimony compound is used as component (3) in the dot-etching solution of this invention.

Examples of suitable alkali metal chlorides which can be used as component (4) are NaCl, KCl, LiCl, RbCl and CsCl. Calcium chloride and magnesium chloride can also be used as component (4). Component (4) is at least one member selected from hydrogen chloride, alkali metal chlorides, calcium chloride and magnesium chloride. Other compounds which can dissociate and then release a chlorine ion after dissolving in water can also be employed to prevent precipitation of the bismuth and the antimony ion.

In dot-etching solutions (I) and (II), the proportions of the components are such that about 10 to about 30 moles, preferably 15 to 25 moles, of component (2), about 0.001 mole to a saturated solution amount, preferably 0.01 to 0.5 mole, of component (3), and about 0.05 mole to a saturated solution amount, preferably 0.1 to 2 moles, of component (4) are employed per liter of water as component (1). These proportions are appropriate ones generally used in performing the present invention, and should not be construed as limiting the scope of the invention.

Dot-etching solution (II) may contain with the phosphorous acid not more than about 0.8 part by volume of phosphoric acid per part by volume of water, i.e., not more than about 8 moles of phosphoric acid per liter of water. In this case, the amount of phosphoric acid is about 2.5 times the weight of the phosphorous acid as component (2). Within the above-sepcified proportions, the dot-etching solutions of the present invention have a viscosity of not more than about 10 centipoises at 25° C. ± 2° C. If the amount of phosphoric acid exceeds about 8 moles per liter of water, the viscosity of the solution abruptly exceeds 10 centipoises, and increases further. On the other hand, when the amount of phosphorous acid (excluding the phosphoric acid) exceeds 30 moles per liter of water, the viscosity of the solution also exceeds 10 centipoises, and the effects of the present invention are impaired.

The concentration of phosphorous acid greatly affects the shapes of dots after etching, and if the concentration of the phosphorous acid is less than the lower limit specified above, the correspondence of the dot shapes after etching to those before etching is poor. Furthermore, when the concentration of the phosphorous acid exceeds the upper limit specified above, the shapes of etched dots are not markedly affected, and the increasing of the concentration is uneconomical.

Phosphorous acid used in the concentrations specified above does not greatly act on the speed of dot etching. In order to obtain a high dot-etching speed, the use of a bismuth compound and/or an antimony compound is essential in dot-etching solutions (I) and (II). Since these compounds tend to form a precipitate in an aqueous solution of phosphorous acid and/or posphoric acid, as described above a mere solution of a bismuth or antimony compound in an aqueous solution of phosphorous acid and/or phosphoric acid still shows a low dot-etching speed. The precipitation of the bismuth compound and/or antimony compound can be effectively prevented in dot-etching solutions (I) and (II) also by simultaneously dissolving at least one of hydrogen chloride, an alkali metal chloride, calcium chloride and magnesium chloride in the solution. This chloride forms a complex salt with the bismuth compound and/or antimony compound in the aqueous solution containing phosphorous acid and/or phosphoric acid thereby to solubilize the bismuth or antimony compound.

"Halftone dot image of a metal compound mainly of aluminum" (e.g., containing aluminum at about 75 atomic %, preferably 90 atomic % or higher) to which the dot-etching solution of this invention is to be applied is usually formed by imagewise exposing a material comprising a support and a thin metal layer and a photosensitive resin layer formed on the thin metal layer, developing the photosensitive layer, and etching the metal layer. Conventional supports and photosensitive resin layers known in the art [as disclosed in, for example, U.S. patent application Ser. No. 571,817, filed Apr. 25, 1975 (now allowed)] can be used. The metal consists mainly of aluminum. The metal layer can be formed by known techniques, for example, by vapor-deposition of aluminum on a support either alone or together with various other metals such as Cr, Mn, Mo, Fe, Co, Ni, Cu, Ag, Zn or Sn (these other metals are used together with Al as evaporation sources), or by vapor-deposition of various alloys containing Al. The halftone dot images to which the dot-etching solutions of this invention are to be applied are well known, and no detailed description is thus necessary.

In using the dot-etching solutions of this invention, a halftone dot image is formed in the manner described hereinbefore in this specification, and the dot-etching solution is contacted with the image. When the metal layer is thin, the dot-etching solution is employed with the top photosensitive resin resist layer thereon. Specifically, a halftone image-bearing material is immersed in the dot-etching solution, or the dot-etching solution is flowed over the surface of the halftone image. Alternatively, a brush is impregnated with the dot-etching solution, and the solution coated on the surface of the halftone image. In order to improve the contact between the etching solution and the halftone dot image, namely to improve wettability, the dot-etching solution preferably contains a surface active agent such as a polyoxyethylenealkylphenyl ether in an amount of about 0.05 to about 2% by weight, preferably 0.1 to 1% by weight, based on the total weight of the dot-etching solution.

A suitable temperature range at which the dot-etching solution of the invention can be employed is from about 15° C. to about 40° C., preferably from 20° C. to 30° C.

The dot-etching which can be employed in the invention is carried out by impregnating a material to be dot-etched with the dot-etching solution of this invention followed by slowly rocking the vessel containing the material to be dot-etched and the dot-etching solution or by slowly circulating the resulting solution in the vessel.

Japanese patent application No. 87618/76 discloses a dot-etching solution comprising (1) water, (2) phosphoric acid, (3) at least one of a bismuth compound and an antimony compound and (4) at least one of an alkali metal chloride, calcium chloride and magnesium chloride, which has overcome the difficulties of the conventional techniques described above, and possesses characteristics required of dot-etching solutions.

The dot-etching solution described in Japanese patent application No. 87618/76 fully possesses characteristics required of dot-etching solutions, but since it is an aqueous solution containing a large amount of phosphoric acid, it has the defect that the viscosity thereof is high, and it is time-consuming to remove the dot-etching solution after the dot-etching operation. Although this is not a fatal defect of the dot-etching solution, it is extremely inconvenient in practical application. The present invention has remedied this defect, and successfully reduced the viscosity of the solution without impairing the characteristics required of dot-etching solutions.

The present invention overcomes the difficulties associated with known dot-etching solutions, and produces good results in the dot-etching of halftone dot images of a metal. Hence, the present invention provides useful dot-etching solutions for use in the art of handling halftone dot images.

The following Examples are given to illustrate the present invention in more detail. Unless otherwise indicated, all parts, percents, ratios and the like are by weight.

EXAMPLE 1

About 400 mg of an $Al_5Fe_1$ alloy was placed in a tungsten boat disposed in a vacuum deposition device. A polyethylene terephthalate film having a thickness of 100 $\mu$m was placed in the vacuum deposition device at a point about 30 cm away from the evaporation source. Vacuum deposition was performed at a vacuum of about $5 \times 10^{-5}$ torr to produce a vacuum-deposited aluminum/iron alloy film having a thickness of about 60 nm. A photosensitive resin composition of the following formulation was coated on the alloy film to a dry thickness of about 1.5 $\mu$m using a whirler, and dried for 2 minutes in a dryer at 100° C.

| Formulation of the Photosensitive Resin Composition | | |
|---|---|---|
| Copolymer of Methyl Methacrylate and Methacrylic Acid (methacrylic acid content: about 10 mol %) | 1 | g |
| Pentaerythritol Tetraacrylate | 0.85 | g |
| N-Methyl-2-benzoylmethylene-$\beta$-naphthothiazole | 0.06 | g |
| Methyl Ethyl Ketone | 12 | g |
| Methyl Cellosolve Acetate | 12 | g |

The resulting photographic material was imagewise exposed for 40 seconds through a halftone original using light from a Fuji PS Light (a 2 KW metal halide lamp) placed at a distance of 1 meter from the photographic material, and the photosensitive layer and vacuum-deposited metal layer at the unexposed area were removed by impregnating with a processing solution of the following formulation at 26° C. for about 15 seconds.

| Formulation of the Processing Solution | | |
|---|---|---|
| NaOH | 3 | g |

-continued

| Formulation of the Processing Solution | | |
|---|---|---|
| $NaClO_2$ | 5 | g |
| $Na_3PO_4 \cdot 12H_2O$ | 10 | 2 |
| Water | 1 | liter |

The halftone image so prepared was dot-etched with a solution of the following formulation. After dot-etching for 30 seconds at 25° C., the dots decreased in size to an extent of about 10%. The correspondence of the shapes of the dots before and after dot-etching was good. The dot-etching solution used in this example had a viscosity of 8.4 centipoises (measured at 25° ± 2° C.).

| Formulation of the Dot-Etching Solution | | |
|---|---|---|
| NaCl | 2 | g |
| $Bi(NO_3)_3 \cdot 5H_2O$ | 1 | g |
| Phosphorous Acid | 5 | g |
| Phosphoric Acid (85% aq. soln.) | 8 | ml |
| Water | 12 | ml |

EXAMPLE 2

A halftone image prepared in the same manner as in Example 1 was dot-etched with a solution of the following formulation. After dot-etching for 30 seconds at 25° C., the dots decreased in size to an extent of about 10%. Similar to the results obtained in Example 1, the shapes of the dots after etching corresponded to those before etching. The dot-etching solution used in this example had a viscosity of 8.6 centipoises (measured at 25° ± 2° C.).

| Formulation of the Dot-Etching Solution | | |
|---|---|---|
| KCl | 2 | g |
| $Bi(NO_3)_3 \cdot 5H_2O$ | 1 | g |
| Phosphorous Acid | 5 | g |
| Phosphoric Acid (85% aq. soln.) | 8 | ml |
| Water | 12 | ml |

EXAMPLE 3

A halftone image prepared in the same manner as in Example 1 was dot-etched with a solution of the following formulation. After dot-etching for 30 seconds at 25° C., the dots decreased in size to an extent of about 7%. Similar to the results obtained in Example 1, the shapes of the dots after etching corresponded to those before etching. The dot-etching solution used in this example had a viscosity of 7.3 centipoises (measured at 25° ± 2° C.).

| Formulation of the Dot-Etching Solution | | |
|---|---|---|
| Lithium Chloride | 2 | g |
| Bismuth (II) Chloride | 1 | g |
| Phosphorous Acid | 10 | g |
| Phosphoric Acid (85% aq. soln.) | 5 | ml |
| Water | 15 | ml |

EXAMPLE 4

A halftone image prepared in the same manner as in Example 1 was dot-etched with a solution of the following formulation. After dot-etching for 30 seconds at 25° C., the dots decreased in size to an extent of about 10%.

Similar to the results obtained in Example 1, the shapes of the dots after etching corresponded to those before etching. The dot-etching solution used in this example had a viscosity of 10.0 centipoises (measured at 25° ± 2° C.).

| Formulation of the Dot-Etching Solution | |
|---|---|
| Calcium Chloride | 2 g |
| Bismuth (II) Chloride | 1 g |
| Phosphorous Acid | 40 g |
| Water | 20 ml |

EXAMPLE 5

A halftone image prepared in the same manner as in Example 1 was dot-etched with a solution of the following formulation. After dot-etching for 30 seconds at 24° C., the dots decreased in size to an extent of about 10%. Similar to the results obtained in Example 1, the shapes of the dots after etching corresponded to those before etching.

| Formulation of the Dot-Etching Solution | | |
|---|---|---|
| Sodium Chloride | 2 | g |
| Bismuth (III) Chloride | 1 | g |
| Phosphorous Acid | 30 | g |
| Phosphoric Acid (85% aq. soln.) | 2 | ml |
| Water | 20 | ml |

EXAMPLE 6

A halftone image prepared in the same manner as in Example 1 was dot-etched with a solution of the following formulation. After dot-etching for 30 seconds at 24° C., the dots decreased in size to an extent of about 6%. Similar to the results obtained in Example 1, the shapes of the dots after etching corresponded to those before etching.

| Formulation of the Dot-Etching Solution | | |
|---|---|---|
| Potassium Chloride | 2 | g |
| Antimony (III) Chloride | 1 | g |
| Phosphorous Acid | 5 | g |
| Phosphoric Acid (85% aq. soln.) | 5 | ml |
| Water | 15 | ml |

EXAMPLE 7

AZ-1350 (a trademark for an o-quinonediazide-type product of Shipley Co., Ltd.) was coated to a dry thickness of about 1.5 μm using a whirler on an aluminum/iron alloy film vacuum-deposited on a 100 μm-thick polyethylene terephthalate film in the same manner as in Example 1, and then dried for 2 minutes in a dryer at 100° C.

The resulting photographic material was imagewise exposed for 60 seconds through a halftone original using light from a Fuji PS Light (a 2 KW metal halide lamp) placed at a distance of 1 meter from the photographic material. The photosensitive layer and vaccum-deposited film at the exposed portion were washed away by contact with a processing solution of the following formulation at 26° C. for 30 seconds.

| Formulation of the Processing Solution | | |
|---|---|---|
| Sodium Hydroxide | 3 | g |
| Sodium Chloride | 5 | g |
| Sodium Phosphate (dodecahydrate) ($Na_3PO_4 \cdot 12H_2O$) | 10 | g |

-continued

| Formulation of the Processing Solution | | |
|---|---|---|
| Water | 1 | liter |

The halftone image so prepared was dot-etched with a solution of the following formulation. After dot-etching for 30 seconds at 24° C., the dots decreased in size to an extent of about 8%. Similar to the results obtained in Example 1, the shapes of the dots after etching corresponded to those before etching.

| Formulation of the Dot-Etching Solution | | |
|---|---|---|
| Water | 20 | ml |
| Phosphorous Acid | 35 | g |
| Sodium Chloride | 2 | g |
| Bismuth Oxide ($Bi_2O_3$) | 1 | g |

While the invention has been described in detail and with reference to specific embodiments thereof, it will be apparent to one skilled in the art that various changes and modifications can be made therein without departing from the spirit and scope thereof.

What is claimed is:

1. A dot-etching solution for dot-etching a halftone image of a metal composed mainly of aluminum, said dot-etching solution comprising
   (1) water,
   (2) (a) phosphorous acid or (b) phosphorous acid and phosphoric acid,
   (3) at least one of a bismuth compound and an antimony compound, and
   (4) at least one compound selected from hydrogen chloride, an alkali metal chloride, calcium chloride and magnesium chloride.

2. The dot-etching solution of claim 1, wherein said dot-etching solution contains phosphorous acid (a) as component (2).

3. The dot-etching solution of claim 1, wherein said dot-etching solution contains phosphorous acid and phosphoric acid (b) as component (2).

4. The dot-etching solution of claim 2, wherein said dot-etching solution has a viscosity at 25° ± 2° C. of about 10 centipoises or less.

5. The dot-etching solution of claim 3, wherein said dot-etching solution has a viscosity at 25° ± 2° C. of about 10 centipoises or less.

6. The dot-etching solution of claim 1, wherein said bismuth compound is a bismuth halide, a bismuth oxide, $Bi_2(SO_4)_3$ or $Bi(NO_3)_3$ and said antimony compound is an antimony halide, an antimony oxide, $Sb_2(SO_4)_3$ or $Sb(NO_3)_3$.

7. The dot-etching solution of claim 1, wherein said alkali metal chloride is lithium chloride, potassium chloride, sodium chloride, rubidium chloride or cesium chloride.

8. The dot-etching solution of claim 2, wherein about 10 to about 30 mols of said phosphorous acid, about 0.001 mol to a saturated solution of said at least one of a bismuth compound and an antimony compound and about 0.05 mol to a saturated solution of said at least one of hydrogen chloride, an alkali metal chloride, calcium chloride and a magnesium chloride are present in said solution per liter of water.

9. The dot-etching solution of claim 3, wherein about 10 to about 30 mols of said phosphorous acid and said phosphoric acid, about 0.001 mol to a saturated solution of said at least one of a bismuth compound and an antimony compound and about 0.05 mol to a saturated solution of said at least one of hydrogen chloride, an alkali metal chloride, calcium chloride and a magnesium chloride are present in said solution per liter of water.

* * * * *